United States Patent [19]
Evans et al.

[11] Patent Number: 5,317,139
[45] Date of Patent: May 31, 1994

[54] FILM OPTICAL CODE READER HAVING CLOCK AND DATA SENSORS

[75] Inventors: Stuart G. Evans; John E. Morse, both of Rochester; Thomas C. Jessop, Webster, all of N.Y.

[73] Assignee: Eastman Kodak Company, Rochester, N.Y.

[21] Appl. No.: 963,961

[22] Filed: Oct. 20, 1992

[51] Int. Cl.⁵ .............................................. G06K 7/10
[52] U.S. Cl. .................................... 235/462; 235/454
[58] Field of Search ...................... 235/473, 462, 454; 250/570

[56] References Cited

U.S. PATENT DOCUMENTS

| | | | |
|---|---|---|---|
| 3,885,866 | 5/1975 | Stearns | 353/26 |
| 4,324,484 | 4/1982 | Johnson | 355/5 |
| 4,629,876 | 12/1986 | Kubota et al. | 235/473 |
| 4,638,170 | 1/1987 | Kubota | 250/566 |
| 4,659,213 | 1/1987 | Natsumoto | 355/38 |
| 4,707,120 | 11/1987 | Yamamoto | 355/52 |
| 4,797,713 | 1/1989 | Terashita et al. | 355/77 |
| 4,912,502 | 3/1990 | Kanji et al. | 355/29 |
| 4,914,471 | 4/1990 | Saeki et al. | 355/40 |
| 4,918,484 | 4/1990 | Ujiie et al. | 355/41 |
| 4,937,615 | 6/1990 | Tokuda | 355/35 |
| 4,961,086 | 10/1990 | Takenaka | 235/462 |
| 4,973,829 | 11/1990 | Ishida et al. | 235/462 |
| 5,164,574 | 11/1992 | Ujiie et al. | 235/462 |

FOREIGN PATENT DOCUMENTS 85234  4/1987  Japan .

Primary Examiner—Donald Hajec
Assistant Examiner—Jhihan Clark
Attorney, Agent, or Firm—Frank Pincelli

[57] ABSTRACT

An optical bar code reader includes a pair of clock sensors and a pair of data sensors for respectively reading the data track and clock track of the optical bar code. The data track sensors are offset from the clock track sensors and the data and clock track sensors detect changes at the edges of the bars in the optical code.

10 Claims, 2 Drawing Sheets

FILM OPTICAL CODE READER HAVING CLOCK AND DATA SENSORS

FIELD OF THE INVENTION

The invention relates generally to the field of photography and particularly to an optical bar code reader for reading a bar code formed on a filmstrip.

BACKGROUND OF THE INVENTION

Manufacturers of photographic film have placed a bar code along one of the edges of filmstrips to supply information about the film to devices contained within photographic printers. Two bar codes usually appear on every frame of the filmstrip. The device uses the information contained in the bar code to set or adjust various photographic printer parameters to produce better quality prints.

The bar code includes a data track and a clock track. The bar and clock tracks appear as a latent image between the sprocket perforations along one of the edges of the filmstrip. The information contained within the bar code clock track specifies the location of the data bits contained in the data track and help locate the entry and exit codes contained in the data track. Data track information includes: the entry codes; the film product class; the film type; frame number, a reserved data bit and the exit code.

The prior art used a data sensor, an amplifier, an analog-to-digital converter and a microprocessor, that used software to perform logarithmic calculations, to process the data track information. A clock sensor, an analog-to-digital converter, and a microprocessor, that used software to perform calculations, were used to process the clock track information. Prior art analog-to-digital converters were only able to sample each bar of the bar code at a film speed of 18 inches per second three to four times. If the speed of the film was increased, the prior art devices were not able to accurately read the bars of the bar code. Thus, one of the disadvantages of the prior art was that fast film processing speeds could not be used since the bars of the bar code were not able to be accurately read.

PROBLEMS TO BE SOLVED BY THE INVENTION

Notchers were utilized to cut a notch in the edge of the negative of the filmstrip at the center of each frame to inform the photographic printer of the location of the photographic image Oftentimes the notch removes a portion of the bar code. Thus, the printer is unable to read the notched bar code.

Sometimes the edge of the film was exposed to light before the film was processed and hence the bar code appearing on the edge of the film was either totally or partially obliterated.

Because of notches, edge fog and other equipment errors prior art optical readers had difficulty in reading optical bar codes 2-3% of the time, when the filmstrip was moving past the optical reader between 11 and 18 inches per second. If the speed of the filmstrip was increased above 18 inches a second, the optical reader had difficulty reading the bar codes.

The prior art difficulty in reading optical bar codes was amplified on film reorder. Typically, a customer would want one print of the negative that appeared on a four-negative strip. Sometimes there was only one bar code associated with the negative and that bar code could not be read. In the above case the printer would not know how to print the negative optimally, i.e., it would have to take its best guess at printing the negative.

Another disadvantage of the prior art was that erroneous bar code readings were obtained when a notch or edge fog removed a portion of the data track and no clock track information was missing. When this was the case the prior art would use erroneous information to print the negative.

Another disadvantage of the prior art was that the prior art equipment was expensive and required complicated software

SUMMARY OF THE INVENTION

The present invention overcomes the disadvantages of the prior art, by providing an optical reader that is able to read optical bar codes more accurately and more rapidly than prior art optical readers. This invention reads the bar code in an analog fashion. Thus, it does not need an analog-to-digital converter. Hence, the problems caused by prior art analog-to-digital converters are eliminated. The invention also does not require a microprocessor to read and interpret incoming sensor signals.

The apparatus of this invention measures and utilizes the density differences between bars in the bar code. There is a theoretical 4-to-1 voltage ratio between a bar present and no bar present (based upon ANSI specifications).

The foregoing is achieved by providing a code reader comprising a first and a second data sensor and a first and a second clock sensor for reading the data track and clock track of a transmissive optical bar code formed on a portion of a surface that is moved past said code reader and illuminated by a light source the Reader, is characterized in that: said first and second data sensors are positioned adjacent to each other, in the same plane, in the direction of surface travel and the combined width of said first and second sensors is no larger than the minimum bar space width of the optical code; said first and second clock sensors are positioned adjacent to each other, in the same plane, in the direction of surface travel and the combined width of said first and second data sensors is no larger than the minimum bar space width of the optical code, wherein said first and second clock sensors are offset from said first and second data sensors in the downstream direction of surface travel; means coupled to said data sensors for detecting optical bar code transitions by determining the ratio of the signals sensed by said data sensors; means coupled to said clock sensors for detecting optical bar code transitions by determining the ratio of the signals sensed by said clock sensors; and means coupled to said data and clock transitions detecting means for processing the detected data and clock transition signals to determine the information contained in the data track and clock track of the optical code.

DESCRIPTION OF THE PREFERRED EMBODIMENT

Figure 1:
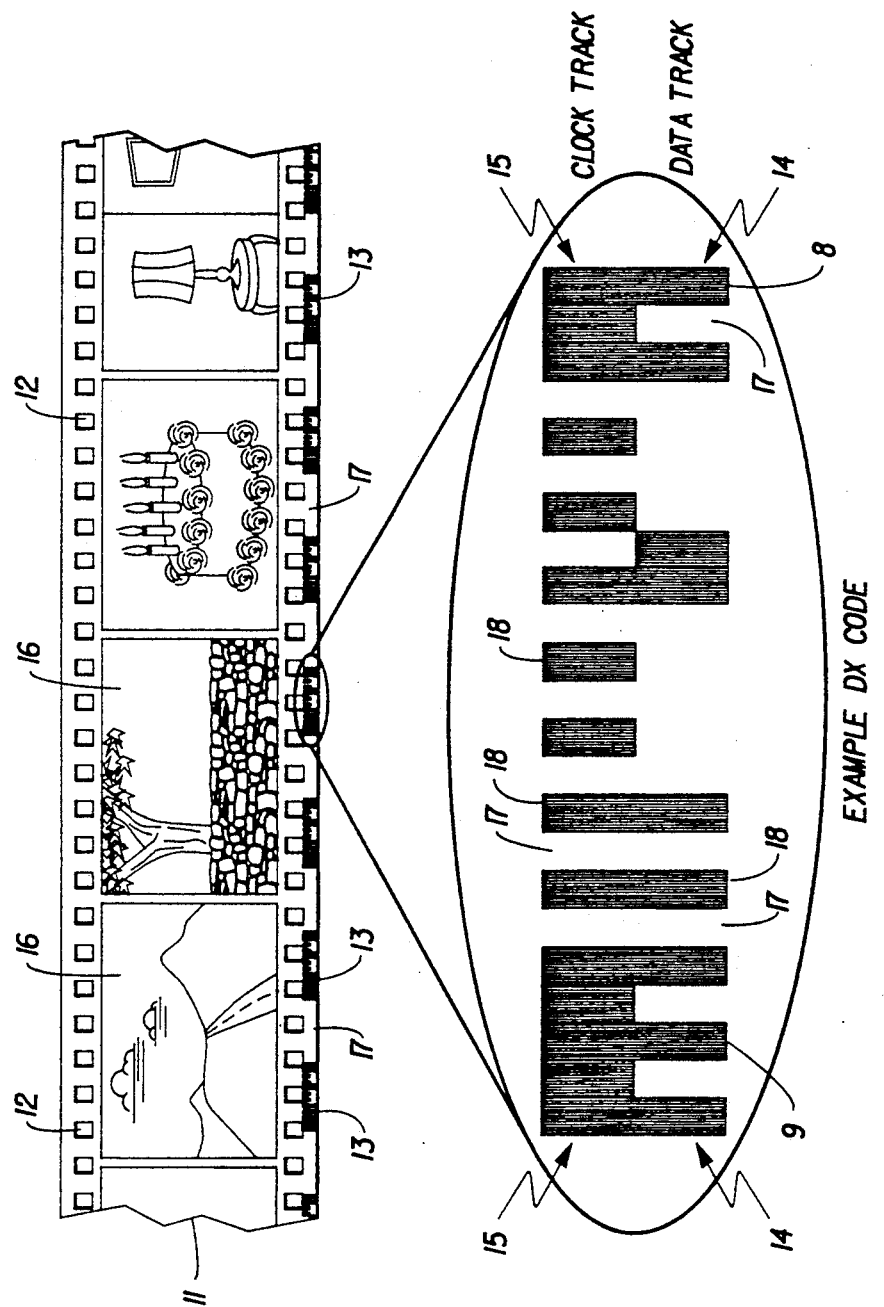
FIG. 1 is a diagram that illustrates a filmstrip that contains a bar code.

Referring now to the drawings in detail, and more particularly to FIG. 1, the reference character 11 represents a filmstrip that has a plurality of sprocket engaging perforations 12. A two-track latent image bar code 13 of a plurality of bits i.e. 15 bits with a start sequence 8 and a stop sequence 9 at the beginning and end of code 13 is printed along one of the edges of filmstrip 11. Sequences 8 and 9 are interchangeable depending upon the direction of travel of filmstrip 11. Typically code 13 appears twice per filmstrip frame 16. Code 13 has a data track 14 and a clock track 15, that indicates the location of the data bits. Data track information 14 is used to indicate film product class, manufacturer code, and frame numbers.

When filmstrip 11 is not in the printer (not shown) an open gate condition exists and a zero film density reading will be obtained. When filmstrip 11 is in the printer, the lowest density reading on filmstrip 11 is called D min. D min. is a result of the transparent base orange mask and slight amount of chemical fog of the emulsion of filmstrip 11. Chemical fog exists because a few silver halide crystals will develop, even though they received no exposure. Thus, no bar 17 will have a reading of D min.

D min. has been measured for various films when the film is exposed to light having a wavelength of 700 nm. The minimum D min. for current films of various manufacturers at 700 nm is greater than 0.2.

With the density of the film being 0.2, we will set the bar code sensors (not shown) open gate amplifier output voltage to 10 volts. The bar code sensors amplifier output voltage is related to the density of the film by the following equation.

$$D = -Log(V/10)$$

Thus, when D min. is 0.2, the sensors amplifier output voltage will be 6.309 volts. Assuming that the open gate sensors amplifier output voltage may drift plus or minus 10%. The open gate amplifier output voltage will be between 9 and 11 volts and D min. will be between 5.678 and 6.940 volts. Hence, any amplifier output voltage reading above 7 volts would indicate that there is no film in the film gate (not shown).

ANSI specifications state that there is a 0.6 density difference between no bar 17 (D min) and the place where a bar 18 is present in code 13. This will cause the sensors amplifier output voltage when a bar 18 is present at a particular location in bar code 13 and when no bar 17 is present at a particular bar code 13 location to be four times greater in a D min area (no bar 17) than a bar 18 area. Thus, the ratio of the sensors amplifier output voltage when no bar 17 is present in code 13, and when a bar 18 is present should be at least a 4:1 ratio for every film type, even if there is some edge fog.

Figure 2:
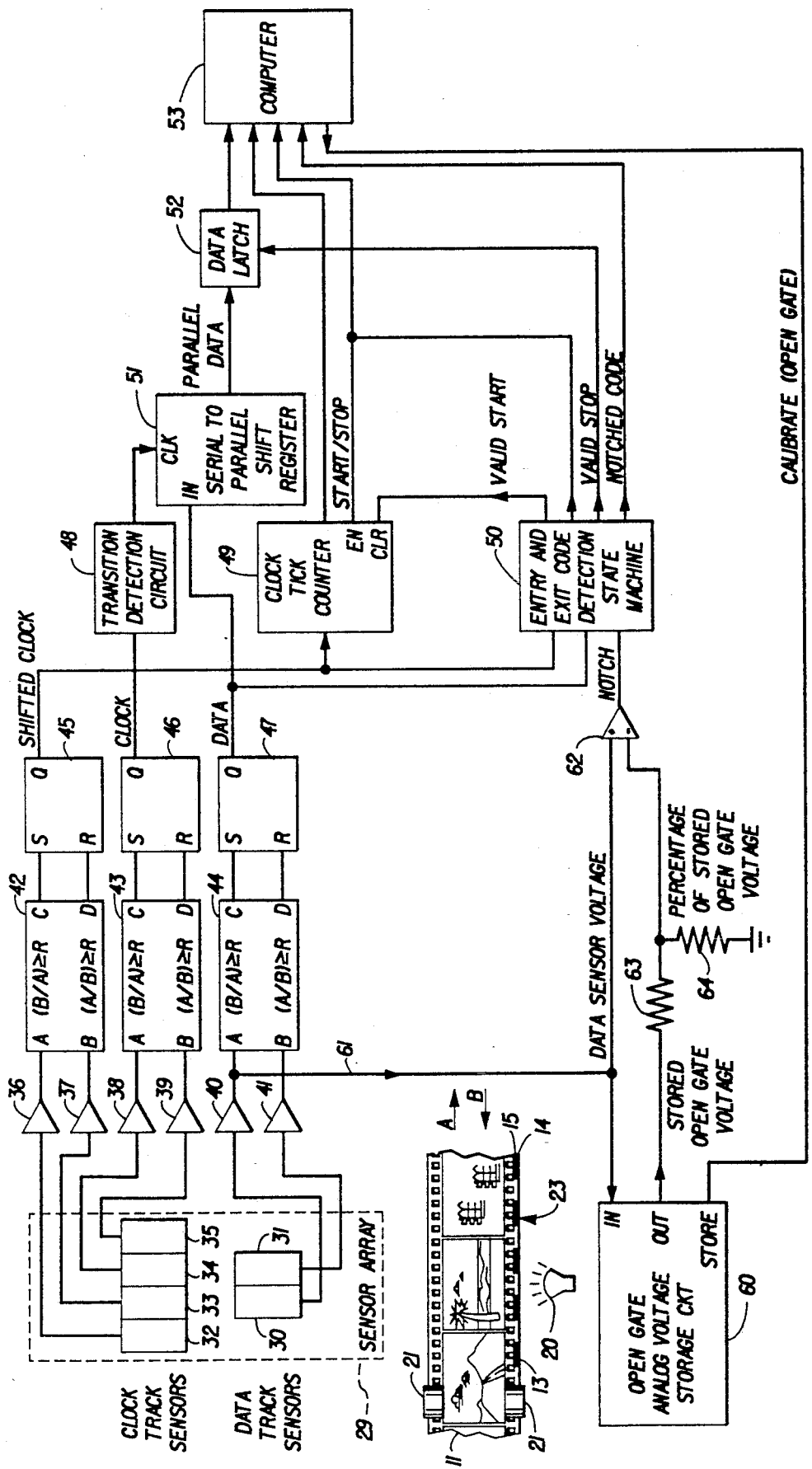
FIG. 2 is a diagram that show a system for reading a filmstrip in the vicinity of light sensors

FIG. 2 is a diagram that shows filmstrip 11 with data track 14 and clock track 15 in the vicinity of sensor array 29. Sensor array 29 comprises data track light sensors 30 and 31 and clock track light sensors 32, 33, 34 and 35. A 700 nm light source 20 is positioned under filmstrip 11, data track sensors 30 and 31 and clock track sensors 32, 33, 34 and 35. The light emitted from light source 20 will be transmitted through filmstrip 11 so that the dark and light portions that represent a bar 18 and no bar 17 of data track 14 may be detected by sensors 30 and 31 and the dark and light portions that represent a bar 18 and no bar 17 of clock track 15 may be detected by sensors 32, 33, 34 and 35. Rollers 21 are utilized to move filmstrip 11 in direction A in a manner that sensors 30, 31, 32, 33, 34 and 35 will follow the path of edge 23 of filmstrip 11 to enable data sensors 30 and 31 and clock sensors 32, 33, 34 and 35 to respectively read the bars of data track 14 and clock track 15. Data sensors 30 and 31 and clock sensors 32-35 are light sensitive sensors such as phototransistors or photodiodes.

The maximum width of sensors 30-35 is equal to one half the minimum bar width of an individual no bar 17 or bar 18, which is equal to approximately 0.015 inches.

Data sensors 30 and 31 and clock sensors 34 and 35 are configured in the above manner to insure that data sensors 30 and 31 will detect a transition between a bar 18 and no bar 17 or no bar 17 and bar 18 of data track 14 before clock track sensors 34 and 35 detect a transition between a corresponding clock track 15 bar 18 and no bar 17 or no bar 17 and bar 18. This permits data sensors 30 and 31 to detect and read stable data before clock sensors 34 and 35 begin to cause the data to be processed.

Clock sensors 32 and 33 are configured in the above manner to permit data sensors 30 and 31 to detect and read stable data before clock sensors 32 and 33 begin to cause the data to be processed.

This permits clock track sensors 32 and 33 and data track sensors 30 and 31 to detect start sequence 8 and stop sequences 9 of bar code 13 before the data is stored by clock sensors 34 and 35 and data sensors 30 and 31.

This invention is configured in a manner that the start and stop sequences of bar code 13 and data track 14 may be individually reversed so that start sequence 8 of bar code 13 and data track 14 becomes stop sequence 9 of bar code 13 and data track 14. The foregoing is useful when rollers 21 move filmstrip 11 in direction B.

The output of sensor 32 is coupled to the input of amplifier 36 and the output of sensor 33 is coupled to the input of amplifier 37. The output of sensor 34 is coupled to the input of amplifier 38 and the output of sensor 35 is coupled to the input of amplifier 39. The output of data track sensor 30 is coupled to the input of amplifier 40 and the output of data track sensor 31 is coupled to the input of amplifier 41. Amplifiers 36-41 are amplifiers which have a gain and offset adjust. The gain adjust is used to insure that the output of amplifiers 36-41 will have a 10 volt output during an open gate condition i.e. when filmstrip 11 is not between light source 20 and sensor array 29. The offset adjust is used to insure that the output of amplifiers 36-41 will compensate for dark current and offset voltage so that amplifiers 36-41 will respond correctly to a known high density such as a two neutral density filter.

The output of amplifier 36 is connected to the A port of ratio detector 42 and the output of amplifier 37 is connected to the B port of ratio detector 42. Detector 42 is configured in such a manner that port C will have an output when the ratio of the signal between port B and port A is greater than voltage ratio when a bar 18 is present over sensor 32 and no bar 17 is present over sensor 33. The density difference between a bar 18 and a no bar 17 is 0.6. A density of 0.6 would be 10 exp 0.6, which would equal approximately 4. Hence, a density less than 4 would be used by the apparatus of this invention. Port D will have an output when the ratio of the signal between port A and port B of detector 42 is greater than or equal to R. R is a number that represents the theoretical voltage ratio when a bar 18 is present over sensor 33 and no bar 17 is present over sensor 32. The density difference between a bar 18 and no bar 17 is 0.6. A density of 0.6 would be 10 exp 0.6. A density of 0.6 would be 10 exp 0.6, which would equal approximately 4. Hence, a density less than 4 would be used by the apparatus of this invention.

When port C of ratio detector 42 has an output, that output will be transmitted to set input S of Set/Reset flip flop 45 and when port D has an output, that output will be transmitted to Reset input R of Set/Reset flip flop 45. The output of Q of Set/Reset flip flop 45 is transmitted to one of the inputs of Clock Tick Counter 49 and one of the inputs of Entry and Exit Code Detection State Machine 50. The output Q of flip flop 45 will represent clock track 15 on filmstrip 11.

The output of amplifier 38 is connected to the A port of ratio detector 43 and the output of amplifier 37 is connected to the B port of ratio detector 43. Detector 43 is configured in such a manner that port C will have an output when the ratio of the signal between port B and port A is greater than or equal to R. R is a number that represents the theoretical voltage ratio when a bar 18 is present over sensor 34 and no bar 17 is present over sensor 35 the density difference between a bar 18 and no bar 17 is 0.6. A density of 0.6 would be 10 exp 0.6 which would equal 4. Hence, a density less than 4 would be used by the apparatus of this invention. Port D will have an output when the ratio of the signal between port A and port B of detector 43 is greater than or equal to R. R is a number that represents the theoretical voltage ratio when a bar 18 is present over sensor 34 and a no bar 17 is present over sensor 35. The density difference between a bar 18 and a no bar 17 is 0.6. A density of 0.6 would be 10 exp 0.6, which would equal approximately 4. Hence, a density less than 4 would be used by the apparatus of this invention.

When port C of ratio detector 43 has an output, that output will be transmitted to set input S of Set/Reset flip flop 45 and when port D has an output, that output will be transmitted to Reset input R of Set/Reset flip flop 46. The output Q of Set/Reset flip flop 46 is transmitted to one of the inputs of transition detection circuit. The output Q of flip flop 46 will represent the clock track 15 on filmstrip 11. Every time the clock input to detection circuit 48 changes state, circuit 48 changes state and circuit 48 generates an output pulse.

The output of amplifier 40 is connected to the A port of ratio detector 44 and the output of amplifier 44 is connected to the B port of ratio detector 44. Detector 44 is configured in such a manner that port C will have an output when the ratio of the signal between port B and port A is greater than or equal to R. R is a number that represents the theoretical voltage ratio when a bar 18 is present over sensor 30 and no bar 17 is present over sensor 31. The density difference between a bar 18 and no bar 17 is 0.6. A density of 0.6 would be 10 exp 0.6, which would equal approximately 4. Hence, a density less than 4 would be used by the apparatus of this invention. Port D will have an output when the ratio of the signal between port A and port B is greater than or equal to R. R is a number that represents the theoretical voltage ratio when bar 18 is present over sensor 30 and no bar 17 is present over sensor 31. The density difference between a bar 18 and no bar 17 is 0.6. A density of 0.6 would be 10 exp 0.6, which would equal approximately 4. Hence, a density less than 4 would be used by the apparatus of this invention.

When port C of ratio detector 44 has an output, that output will be transmitted to set input S of Set/Reset flip flop 47 and when port D has an output, that output will be transmitted to Reset input R of Set/Reset flip flop 47. The output Q of Set/Reset flip flop 47 is transmitted to one of the inputs of serial to parallel shift register 51 and one of the inputs of Entry and Exit Code Detection State Machine 50. The output of flip flop 47 is representative of data track 14 of filmstrip 11.

The spatial relationship of sensor 30–35 of sensor array 29 cause the outputs of flip flops 45, 46 and 47 to be shifted in the following manner. The output of flip flop 47 will be shifted one half the bar pitch or bar width of bar 18 or no bar 17 after the output of flip flop 45. The output of flip flop 46 will be shifted one half the bar pitch or bar width of bar 18 or no bar 17 after the output of flip flop 47. The foregoing permits data from flip flop 47 to be shifted into shift register 51 by the clock output of flip flop 46 that is transmitted to Register 51 via circuit 48.

Entry and Exit Code Detection State Machine 50 is used to detect the start and stop sequence of data track 14 and clock track 15 of filmstrip 11 based upon the outputs of flip flops 45 and 47. Machine 50 may be a field programmable logic sequencer manufactured by Signetics Company—P.O. Box 3409 Sunnyvale, Calif. 94088 under the part number PLS159A. The program table that is used to program Machine 50 is attached hereto as Appendix A.

Machine 50 has four outputs the first output of machine 50 represents a valid start to the input of counter 49. This signal resets counter 49 to zero. This signal is asserted when detectors 30, 31, 32 and 33 detect start sequence 8 on filmstrip 11. The second output of machine 50 is the start, stop not signal which is connected to the enable input of counter 49 and one of the inputs of computer 53. The aforementioned start, stop not signal enables counter 49 to count the pulses output by flip flop 45. The aforementioned start, stop not signal also causes computer 53 to read the information stored in data latch 52 and read the clock count from counter 49. The information contained in counter 49 may be used to determine if data latch 52 contains valid data as a valid code will have a known number of clock ticks. There are two valid codes a long code and a short code. The long code contains more clock pulses than the short code. Thus, the length of the code in data latch 52 may be determined by computer 53. The third output of machine 50 is the valid stop signal, which is connected to the input of data latch 52. When valid stop sequence 9 on filmstrip 11 is detected by sensors 30, 31, 32 and 33, machine 50 will output a valid stop signal which will cause data latch 55 to receive in parallel the data stored in register 51.

Open Gate Analog Voltage Storage Circuit 60 is used to store the open gate voltage i.e. when filmstrip 11 is not between light source 20 and sensor array 29. The open gate voltage is the output of amplifier 40 which is coupled to the input of circuit 60 via line 61. The negative input to comparator 62 is the output of amplifier 40 i.e. the open gate voltage. The stored open gate voltage output of circuit 60 is connected to the input of resistor divider 63 and resistor divider 64. The positive input to comparator 62 is the voltage output produced by resistor 63 and 64 which act as a voltage divider and create a percentage of the stored open gate voltage. The store input to circuit 60 is the output of computer 53. The store input is produced by computer 53 when filmstrip 11 is not between light source 20 and sensor array 29.

Comparator 62 compares its negative input to its positive input. When the negative input to comparator 62 is a specified amount above the stored open gate voltage, comparator 62 will have a low output indicating that filmstrip 11 is not present between light 20 and array 29.

The output of comparator 62 is connected to one of the inputs of machine 50. Comparator 62 determines whether or not filmstrip 11 is present between light source 20 and sensor array 29. When machine 50 is in the process of reading a code i.e. the start, stop not signal is present and machine 50 receives a low input from comparator 62, then the start, stop not signal is removed, the notched code signal is transmitted to computer 53 and further attempts to read incoming code are abandoned until filmstrip 11 is present between light 20 and sensor 29 causing the output of comparator 62 to be removed. The foregoing is useful to determine the presence of notches on filmstrip 11.

The above specification describes a new and improved optical reader. It is realized that the above description may indicate to those skilled in the art additional ways in which the principles of this invention may be used without departing from its spirit. It is, therefore, intended that this invention be limited only by the scope of the appended claims.

APPENDIX A

```
PLS159          ! F/F TYPE    ! E(b)= !E(a) = !POLARTY!
                !             !       !       !
T !             !:.:.:.:.:.:.:! A   ! A    !L:L:L:L!   Checksum = $C028
E !-----------------------------------------------------
R ! !  I  ! B(i) !    Q(p)     !    Q(n)    ! B(o)   !
M !C!-----------------------------------------------------
   ! !3_2_1_0!3_2_1_0!7_6_5_4_3_2_1_0!7_6_5_4_3_2_1_0!3_2_1_0!
  0!-!L H H H!- - - -!- - - -,H H H H!- H - -,- - - L!. . . .!St 1. Goto st 2.
  1!-!H H H H!- - - -!- - - -,H H H L!- - - -,- - L -!. . . .!St 2. Goto st 3.
  2!-!L H H H!- - - -!- - - -,H H L L!- - - -,- - - H!. . . .!St 3. Goto st 4.
  3!-!H H H H!- - - -!- - - -,H H L H!- - - -,- L - -!. . . .!St 4. Goto st 5.
  4!-!L H H H!- - - -!- - - -,H L L H!- - - -,- - - L!. . . .!St 5. Goto st 6. To entry cd.
  5!-!H L H H!- - - -!- - - -,H L L H!- - - -,L - - -!. . . .!St 5. Goto st 10. To exit cd.
  6!-!H H H H!- - - -!- - - -,H L L L!- - - -,- - H -!. . . .!St 6. Goto st 7.
  7!-!H L H H!- - - -!- - - -,H L H L!- - - -,- - - H!. . . .!St 7. Goto st 8.
  8!-!L L H H!- H -!- - - -,H L H H!- L - H,L - - -!. . . .!St 8. Goto st 9.Val_Stp LFF
  9!-!L L H H!- H -!- - - -,L L L H!- L L L,- H - -!. . . .!St 10. Goto st 11.Val_Strt LFF
 10!-!L L H H!- L -!- - - -,H L H H!- L L L,L - - -!. . . .!St 8. Goto st 9.Val_Strt FFF
 11!-!L L H H!- L -!- - - -,L L L H!- L - H,- H - -!. . . .!St 10. Goto st 11.Val_Stp FFF
 12!-!- L H H!- - - -!- - - -,H H - L!- L - -,- - H H!. . . .!St 2 or 3. Goto st 1. Reset
 13!-!- L H H!- - - -!- - - -,H H L H!- L - -,- - H -!. . . .!St 4. Goto st 1. Reset.
 14!-!L L H H!- - - -!- - - -,H L L H!- L - -,- H H -!. . . .!St 5. Goto st 1. Reset.
 15!-!- L H H!- - - -!- - - -,H L L L!- L - -,- H H H!. . . .!St 6. Goto st 1. Reset.
 16!-!L - H H!- - - -!- - - -,H L H L!- L - -,- H - H!. . . .!St 7. Goto st 1. Reset.
 17!-!- H H H!- - - -!- - - -,H L H H!- L - -,- H - -!. . . .!St 8. Goto st 1. Reset.
 18!-!- - H H!- - - -!- - - -,L L H H!- - - -,H H - -!. . . .!St 9. Goto st 1. Reset.
 19!-!- H H H!- - - -!- - - -,L L L H!- L - -,H H H -!. . . .!St 10. Goto st 1. Reset.
 20!-!- - H H!- - - -!- - - -,L H L H!- - - -,H - H -!. . . .!St 11. Goto st 1. Reset.
 21!-!- - H -!- - H -!- - - -,L L H H!- - - -,- - - -!A . . .!Assert Val_Stp. St 9. LFF
 22!-!- - H -!- - H -!- - - -,L H L H!- - - -,- - - -!A . . .!Assert Val_Strt. St 11. LFF
 23!-!- - H -!- - L -!- - - -,L H L H!- - - -,- - - -!A . . .!Assert Val_Stp. St 11. FFF
 24!-!- - H -!- - L -!- - - -,L L H H!- - - -,- - - -!A . . .!Assert Val_Strt. St 9. FFF
 25!-!- - H L!- - - -!- - - -,L - - -!- - H -,- - - -!. . . .!Notch between start and stop.
 26!-!- - H L!- - - -!- - - -,- - - -!- L - H,H H H H!. . . .!No Film/Notch Reset to St 1.
 27!-!- - L -!- - - -!- - - -,- - - -!- L L H,H H H H!. . . .!Power Up Reset to St 1.
 28!-!H - - -!- - - -!- L - H,- - - -!- L - -,- - - -!. . . .!Assert Clr_FF.
 29!-!- - - -!- - - -!- L - -,- - - -!- H - -,- - - -!. . . .!Deassert CLR_FF.
 30!-!- - - -!- - - -!- - - -,- - - -!- - - -,- - - -!. . . .!
 31!-!- - - -!- - - -!- - - -,- - - -!- - - -,- - - -!. . . .!
Fc!0!0 0 0!0 0 0 0!0 0 0 0,0 0 0 0!
Pb!.!0 0 0!0 0 0 0!0 0 0 0,0 0 0 0!
Rb!.!0 0 0!0 0 0 0!0 0 0 0,0 0 0 0!
Lb!.!0 0 0!0 0 0 0!0 0 0 0,0 0 0 0!
Pa!.!0 0 0!0 0 0 0!0 0 0 0,0 0 0 0!
Ra!.!0 0 0!0 0 0 0!0 0 0 0,0 0 0 0!
La!.!0 0 0!0 0 0 0!0 0 0 0,0 0 0 0!
D3!-!- - - -!- - - L!- - - -,- - - -!  Combinatorial output enabled. Valid_Stop-.
D2!-!- - - -!- - - L!- - - -,- - - -!  Combinatorial output enabled. Valid_Start-.
D1!.!0 0 0!0 0 0 0!0 0 0 0,0 0 0 0!
D0!.!0 0 0!0 0 0 0!0 0 0 0,0 0 0 0!
     ! ! ! ! ! ! ! ! ! ! ! ! ! !-----------------State_0
     ! ! ! ! ! ! ! ! ! ! ! ! !-------------------State_1
     ! ! ! ! ! ! ! ! ! ! ! !---------------------State_2
     ! ! ! ! ! ! ! ! ! ! !-----------------------State_3
     ! ! ! ! ! ! ! ! ! !-------------------------Start/Stop-
     ! ! ! ! ! ! ! ! !---------------------------Notched_Code-
     ! ! ! ! ! ! ! !-----------------------------In_Sequence-
     ! ! ! ! ! ! !-------------------------------Clr_FF
     ! ! ! ! ! !-------------------Comb_OE-  (Input)
     ! ! ! ! !---------------------Mode_Select (LFF/FFF-) (Input)
     ! ! ! !-----------------------Valid_Start- (Output)
     ! ! !-------------------------Valid_Stop- (Output)
     ! !------------Notch-
     ! !------------Reset-
     !--------------Shft_Clock
     !----------------Data
```

Copyright © 1992 Eastman Kodak Co.

What is claimed is:

1. A code reader comprising a first and a second data sensor and a first and a second clock sensor for reading the data track and clock track of a transmissive optical bar code formed on a portion of a surface that is moved past said code reader and illuminated by a light source, is characterized in that:

said first and second data sensors are positioned adjacent to each other, in the same plane, in the direction of surface travel and the combined width of said first and second sensors is no larger than the minimum bar space width of the optical code;

said first and second clock sensors are positioned adjacent to each other, in the same plane, in the direction of surface travel and the combined width of said first and second data sensors is no larger than the minimum bar space width of the optical code, wherein said first and second clock sensors are offset from said first and second data sensors in the downstream direction of surface travel;

means coupled to said data sensors for detecting optical bar code transitions by determining the ratio of the signals sensed by said data sensors;

means coupled to said clock sensors for detecting optical bar code transitions by determining the ratio of the signals sensed by said clock sensors; and means coupled to said data and clock transitions detecting means for processing the detected data and clock transition signals to determine the information contained in the data track and clock track of the optical code.

2. The code reader claimed in claim 1, wherein said first and second clock sensors are offset by $\frac{1}{2}$ a bar width.

3. The code reader claimed in claim 1, wherein said data transition detection means comprises: one or more data ratio detectors.

4. The code reader claimed in claim 3, further including: one or more amplifiers having gain and offset, the input of said amplifiers are coupled the output of said data sensors and the output of said amplifiers are coupled to the input of said data ratio detectors.

5. The code reader claimed in claim 1, wherein said clock transition detection means comprises: one or more clock ratio detectors.

6. The code reader claimed in claim 5, further including: one or more amplifiers having gain and offset, the input of said amplifiers are coupled the output of said clock sensors and the output of said amplifiers are coupled to the input of said clock ratio detectors.

7. The code reader claimed in claim 1, further including: a third and a fourth clock sensor that sense the clock track of the illuminated optical bar code, said third and fourth clock sensors are adjacent to each other, in the same plane and the combined width of said third and fourth data sensors is no larger than the minimum bar space width of the optical code, wherein said third and fourth clock sensors are offset from said first and second data sensors in the upstream direction of surface travel to obtain an advanced indication of the start and stop sequence of the optical code.

8. The code reader claimed in claim 7, wherein said third and fourth clock sensors are offset by $\frac{1}{2}$ a bar width.

9. The code reader claimed in claim 1, wherein said processing means comprises:

data means for storing the output of said data transition detection means, which represents the optical bar code data track;

clock means for storing the output of said clock transition detection means, which represents the optical bar code clock track;

means for detecting the start and stop sequence of the optical bar code, said start and stop detecting means are coupled to the output of said data and clock storing means, said start and stop detecting means determines the beginning and end of the optical bar code;

a counter coupled to the output of said clock storing means to determine the length of the optical code; and means coupled to the output of said data storing means for converting the data in each serial optical bar code into parallel optical bar code data.

10. The code reader claimed in claim 4, further including:

means coupled to said amplifiers for storing the output of one or more of said data sensors; and means for comparing the output of said amplifiers with the output of said amplifier storing means to determine whether or not the surface is discontinuous within a optical bar code.

* * * * *